(12) United States Patent
Nystrom et al.

(10) Patent No.: US 7,425,316 B2
(45) Date of Patent: *Sep. 16, 2008

(54) CHEMICAL PROCESS AND COMPOSITION

(75) Inventors: Mats Nystrom, Ytterby (SE); Christina Jarnvik, Nol (SE)

(73) Assignee: Akzo Nobel NV, Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/253,707

(22) Filed: Oct. 20, 2005

(65) Prior Publication Data

US 2006/0034751 A1  Feb. 16, 2006

Related U.S. Application Data

(63) Continuation of application No. 09/878,347, filed on Jun. 12, 2001, now Pat. No. 7,001,584.

(30) Foreign Application Priority Data

Jun. 19, 2000  (EP) .................................. 00850109

(51) Int. Cl.
*C01B 15/023* (2006.01)

(52) U.S. Cl. .................. 423/588; 252/182.12; 423/589; 423/590

(58) Field of Classification Search ................. 423/588, 423/589, 590; 252/182.12
See application file for complete search history.

(56) References Cited

U.S. PATENT DOCUMENTS

| 3,328,128 | A | 6/1967 | Kabisch |
|---|---|---|---|
| 3,699,217 | A | 10/1972 | Schreyer |
| 3,714,342 | A | 1/1973 | Kabisch |
| 3,742,061 | A | 6/1973 | Kabisch |
| 3,789,114 | A | 1/1974 | Giesselmann et al. |
| 3,952,089 | A | 4/1976 | Kabisch et al. |
| 3,965,251 | A | 6/1976 | Shin et al. |
| 4,349,526 | A | 9/1982 | Goor et al. |
| 4,552,748 | A | 11/1985 | Berglin |
| 4,800,073 | A | 1/1989 | Bengtsson |
| 4,800,074 | A | 1/1989 | Bengtsson |
| 5,063,043 | A | 11/1991 | Bengtsson |
| 5,827,493 | A | 10/1998 | Ledon |

FOREIGN PATENT DOCUMENTS

| GB | 834154 | 5/1960 |
|---|---|---|
| GB | 1524883 | 9/1978 |

OTHER PUBLICATIONS

Wayne T. Hess, "Hydrogen peroxide"; Kirk-Othmer Encyclopedia of Chemical Technology Fourth Edition, vol. 13, 1995, pp. 961-995, no month.

*Primary Examiner*—Wayne A. Langel
(74) *Attorney, Agent, or Firm*—Kenyon & Kenyon LLP

(57) ABSTRACT

The invention relates to a process for production of hydrogen peroxide according to the anthraquinone process including alternate hydrogenation and oxidation of one or more quinones selected from anthraquinones and/or tetrahydro anthraquinones in a working solution comprising at least one quinone solvent and at least one hydroquinone solvent, wherein said at least one quinone solvent comprises isodurene in an amount from 15 to 100 wt %. The invention also relates to a composition useful as a working solution at production hydrogen peroxide.

14 Claims, No Drawings

CHEMICAL PROCESS AND COMPOSITION

This application is a continuation of U.S. Ser. No. 09/878,347,filed Jun. 12, 2001, which is hereby incorporated by reference.

The present invention relates to a process for production of hydrogen peroxide according to the anthraquinone process, wherein the working solution comprises a certain mixture of solvents. The invention also concerns a composition comprising such a mixture of solvents that is useful as a working solution at production of hydrogen peroxide.

The most common process for production of hydrogen peroxide is the anthraquinone process. In this process quinones selected from optionally substituted anthraquinones and/or tetrahydro anthraquinones dissolved in a suitable organic solvent mixture, a so called working solution, are hydrogenated to form the corresponding hydroquinones. The hydroquinones are then oxidised back to quinones with oxygen (usually air) with simultaneous formation of hydrogen peroxide, which then can be extracted with water while the quinones are returned with the working solution to the hydrogenation step.

The anthraquinone process is described extensively in the literature, for example in Kirk-Othmer, "Encyclopedia of Chemical Technology", $4^{th}$ Ed., 1993,Vol. 13,pp. 961-995.

For the process to work properly, it is necessary to use a solvent mixture for the working solution in which both quinones and hydroquinones are soluble. Therefore, the solvent mixture in the working solution normally comprises one or more quinone solvents and one or more hydroquinone solvents.

The problem of finding suitable solvents for the working solution has been addressed in, for example, U.S. Pat. Nos. 3,328,128, 4,800,073 and 4,800,074,and GB patent 1524883.

In many cases, the production capacity in a plant is limited by the amount of quinones available for hydrogenation in the working solution or the amount of hydroquinones that can be formed without precipitation thereof. This problem has been found to be of particular importance when the amount of tetrahydro anthraquinones in the working solution is high.

Thus, there is a demand for a working solution based on a solvent combination with improved solubility of both quinones and hydroquinones, particularly of tetrahydro anthraquinones. Furthermore, it is desirable to provide a working solution with comparatively low density, which facilitates the phase separation at an extraction step performed after the hydrogenation and oxidation steps.

It has now been found possible to provide a working solution fulfilling these demands by selecting a certain combination of solvents.

Thus, the invention concerns a process for production of hydrogen peroxide according to the anthraquinone process including alternate hydrogenation and oxidation of one or more quinones selected from anthraquinones and/or tetrahydro anthraquinones in a working solution comprising at least one quinone solvent and at least one hydroquinone solvent, wherein said at least one quinone solvent comprises isodurene (1,2,3,5-tetramethylbenzene) in an amount from 15 to 100 wt %, preferably from about 20 to about 80 wt %, most preferably from about 25 to about 70 wt %.

Most preferably the at least one quinone solvent referred to above substantially consists of one or more essentially non-polar organic solvents, preferably hydrocarbons, while the at least one hydroquinone solvent referred to above most preferably substantially consists of one or more polar organic solvents, suitably essentially non-soluble in water and preferably selected from alcohols, ureas, amides, caprolactams, esters, phosphorus containing substances and pyrrolidones.

It has been found that when the proportion of isodurene compared to other optional quinone solvents is high, the solubility of quinones is improved to such an extent that it is possible to decrease the total amount of quinone solvents in the working solution and instead increase the amount of hydroquinone solvents, and thereby increase the solubility of both quinones and hydroquinones.

In addition to isodurene, the at least one quinone solvent suitably comprises durene (1,2,4,5-tetramethylbenzene), wherein the total amount of isodurene and durene suitably constitutes from about 30 to about 100 wt %, preferably from about 35 to about 80 wt % of the total amount of quinone solvents. In order to avoid precipitation of durene the content thereof should not be too high, preferably not exceeding about 25 wt %, most preferably not exceeding about 20 wt % of the total amount of quinone solvents. The weight ratio isodurene to durene in the working solution is preferably from about 1.5:1 to about 5:1, most preferably from about 2:1 to about 4:1.

The at least one quinone solvent may also comprise other suitably essentially non-polar hydrocarbons, preferably selected from one or more aromatic, aliphatic or naphthenic hydrocarbons, of which aromatic hydrocarbons are most preferred. Particularly suitable quinone solvents include benzene, alkylated or polyalkylated benzenes such as tert-butylbenzene or trimethyl benzene, alkylated toluene or naphthalene such as tert-butyltoluene or methylnaphthalene.

The preferred total content of quinone solvents and consequently also the content of isodurene used in the entire working solution depends on which hydroquinone solvent(s) that are used. In most cases, the suitable content of quinone solvents is from about 25 to about 65 wt %, preferably from about 40 to about 60 wt % of the entire working solution. In most cases, the weight ratio quinone solvents to hydroquinone solvents suitably is from about 0.6 to about 4,preferably from about 1.5 to about 3. The suitable content of isodurene normally is from about 8 to about 52 wt %, preferably from about 11 to about 42 wt % of the entire working solution.

The working solution comprises at least one and preferably at least two hydroquinone solvents, suitably selected from polar organic solvents, which, however, preferably should be essentially non-soluble in water. Suitable hydroquinone solvents may be selected from alcohols, ureas, amides, caprolactams, esters, phosphorus containing substances and pyrrolidones, and include alkyl phosphates (e.g. trioctyl phosphate), alkyl phosphonates, alkylcyclohexanol esters, N,N-dialkyl carbonamides, tetraalkyl ureas (e.g. tetrabutyl urea), N-alkyl-2-pyrrolidones and high boiling alcohols, preferably with 8-9 carbon atoms (e.g. di-isobutyl carbinol). Preferred hydroquinone solvents are selected from alkyl phosphates, tetraalkyl ureas, cyclic urea derivatives and alkyl-substituted caprolactams. One group of preferred hydroquinone solvents are described in the U.S. Pat. Nos. 4,800,073 and 4,800,074 and include alkyl-substituted caprolactams such as octyl caprolactam and cyclic urea derivatives such as N,N'-dialkyl-substituted alkylenurea. Other preferred hydroquinone solvents include di-isobutyl carbinol and tetrabutyl urea, which are advantageous in the sense that they have low density.

The content of hydroquinone solvents in the working solution is preferably from about 15 to about 48 wt %, most preferably from about 18 to about 35 wt %.

The anthraquinones and tetrahydro anthraquinones in the working solution to be hydrogenated are preferably alkyl substituted, most preferably with only one alkyl group, suitably at the 2-position. Preferred alkyl substituents include amyl such as 2-tert-amyl or 2-iso-sec-amyl, ethyl, tert-butyl and 2-hexenyl, and it is particularly preferred that at least ethyl substituted anthraquinones and/or tetrahydro anthraquinones are included. Preferably the working solution to be hydrogenated include a mixture of different alkyl substituted anthraquinones and tetrahydro anthraquinones, more preferably a mixture of ethyl and at least one other alkyl substituted, most preferably amyl substituted anthraquinone and/or tetrahydro anthraquinone. Preferably from about 50 to about 100 mole %, most preferably from about 60 to about 90 mole % of the anthraquinones and the tetrahydro anthraquinones are substituted with one ethyl group. It is also preferred that up to about 50 mole %, most preferably from about 10 to about 40 mole % of the anthraquinones and the tetrahydro anthraquinones are substituted with one amyl group.

It has been found favourable to operate at high amounts of tetrahydro anthraquinones compared to anthraquinones, as it then is possible to achieve high degree of hydrogenation and low losses of active quinones to degradation products. Suitably the molar ratio of tetrahydro anthraquinones to anthraquinones in the working solution to be hydrogenated exceeds 1:1 and is preferably from about 2:1 to about 50:1, most preferably from about 3:1 to about 20:1. In some cases it may be appropriate to operate at a molar ratio only up to about 9:1, but it is also possible to use working solutions almost free from anthraquinones.

The molar ratio of tetrahydro anthraquinones to alkyl anthraquinones in a mature working solution (a working solution used for hydrogen peroxide production during at least six months) is suitably in the same magnitude for the anthraquinones substituted with different groups. The molar ratio for each group differ preferably less than with a factor of about 2.5, most preferably less than with a factor of about 1.7.

The tetrahydro anthraquinones are normally mainly made up of β-tetrahydro anthraquinones, but also some α-tetrahydro anthraquinones may be present.

Besides the direct or indirect hydrogenation to hydroquinones, many secondary reactions take place. For example, the anthrahydroquinones can react further to tetrahydro anthrahydroquinones, which in the oxidation step is converted to tetrahydro anthraquinones, the content of which thus will increase in the working solution. This means that when the process of the invention is started up, the initial working solution may contain no or only small amounts of tetrahydro anthraquinones, as they will form automatically during the course of operation. As soon as the desirable concentrations of anthraquinones and tetrahydro anthraquinones have been reached, at least a portion of the working solution is then normally treated to dehydrogenate tetrahydro anthraquinones back to anthraquinones.

It also occurs direct or indirect formation of unwanted by-products, such as epoxides, octahydro anthraquinones, oxanthrones, anthrones and dianthrones. Some of these compounds, like epoxides can be converted back to anthraquinones, while others, like dianthrones, constitute an irreversible loss of active working solution. It has been found that the formation of undesired by-products can be minimised if the molar ratio of tetrahydro anthraquinones to anthraquinones is maintained within the above specified range.

The high amounts of isodurene in the working solution renders it possible to dissolve high amounts of ethyl substituted tetrahydro anthraquinone, which has lower density than, for example, the highly soluble amyl substituted tetrahydro anthraquinone. It is then possible to combine high concentration of quinones available for hydrogenation in the working solution with low density, thus increasing the production capacity of hydrogen peroxide per volume working solution. The total amount of anthraquinones and tetrahydro anthraquinones in the working solution to be hydrogenated is preferably from about 15 to about 28 wt %, most preferably from about 17 to about 25 wt %, while the density, measured at 20° C., preferably is from about 910 to about 980 kg/m$^3$, most preferably from about 930 to about 970 kg/m$^3$.

The hydrogenation step is normally performed by contacting the working solution with hydrogen gas in the presence of a catalyst at a temperature from about 0 to about 100° C., preferably from about 40 to about 75° C., and at an absolute pressure from about 100 to about 1500 kPa, preferably from about 200 to about 600 kPa. The degree of hydrogenation (as moles hydroquinones per m$^3$ working solution) is suitably from about 350 to about 800, preferably from about 400 to about 650.

The active catalyst may, for example, be a metal selected from any of nickel, palladium, platinum, rhodium, ruthenium, gold, silver, or mixtures thereof. Preferred metals are palladium, platinum and gold, of which palladium or mixtures comprising at least 50 wt % palladium are particularly preferred. The active catalyst may be in free form, e.g. palladium black suspended in the working solution, or be deposited on a solid support such as particles used in the form of a slurry or a fixed bed. However, it is particularly preferred to use a catalyst in the form of an active metal on a monolithic support, for example, as described in U.S. Pat. Nos. 4,552,748 and 5,063,043. Preferred support materials are selected from silica or aluminium oxide.

Before or after the hydrogenation step, at least a portion of the working solution is preferably regenerated in one or several steps to remove water, to keep the desired ratio of tetrahydro anthraquinones to anthraquinones, to convert some undesired by-products from the hydrogenation or the oxidation steps back to active components, and to remove other undesired by-products. The regeneration may include filtration, evaporation of water, and treatment with a porous adsorbent and catalyst based on aluminium oxide.

Other steps in the overall process of producing hydrogen peroxide, such as oxidation with oxygen or air and extraction with water, may be performed in conventional manner as described in the literature.

The invention further concerns a composition useful as a working solution at production of hydrogen peroxide with the anthraquinone process. The composition comprises one or more anthraquinones and/or one or more tetrahydro anthraquinones dissolved in at least one quinone solvent, and at least one hydroquinone solvent, wherein said at least one quinone solvent comprises isodurene in an amount from 15 to 100 wt %, preferably from about 20 to about 80 wt %, most preferably from about 25 to about 70 wt %. Regarding optional and preferred features of the composition, the above description of the process is referred to.

The invention will now further be described in connection with the following Examples, which, however, not should be interpreted as limiting the scope of the invention.

EXAMPLE 1

The solubility of β-tetrahydro ethyl anthraquinone was measured in two different pure quinone solvents:

| Solvent: | Regular mixture aromatic hydrocarbons (mainly $C_{10}$ + $C_9$) (Shellsol™ AB) | Isodurene Technical grade (mixture comprising 69 wt % isodurene, 22 wt % durene), 9 wt % other $C_{10}$ aromatic hydrocarbons |
|---|---|---|
| Solubility at 20° C. | 115 g/liter | 180 g/liter |

EXAMPLE 2

Two different mature working solutions, A (comparative) and B (the invention), were tested in an anthraquinone process, the solutions thus also containing normal degradation products. Both solutions comprised tetrabutyl urea as hydroquinone solvent and 2-ethyl and 2-amyl substituted anthraquinones and tetrahydro anthraquinones (the molar ratio 2-ethyl to 2-amyl exceeded 1:1 and was maintained constant). The molar ratio tetrahydro anthraquinones to anthraquinones exceeded 3:1.

The main difference between the working solutions was that in Solution A the quinone solvent was made up of Shellsol™ AB, a regular mixture of aromatic hydrocarbon with mainly $C_{10}$ and $C_9$ alkyl-benzene (about 85%), while in Solution B the quinone solvent instead was made up of 40 wt % ShellSol™ AB mixed with 60 wt % of isodurene (Technical grade comprising about 69% isodurene, about 22% durene and about 9 wt % other $C_{10}$ aromatic hydrocarbons).

In both cases the total content of tetrahydro anthraquinones and anthraquinones were kept as high as possible to reach high concentrations of hydrogen peroxide in the working solution. However, precipitation β-tetrahydro ethyl anthraquinone and/or its hydroquinone form in the working solution was a limiting factor.

More data are shown in the table below:

|  | Working solution: | |
|---|---|---|
|  | A | B |
| Isodurene as wt % of quinone solvent | 10% | 45% |
| Isodurene as wt % of working solution | 5% | 21% |
| Durene as wt % of quinone solvent | 7% | 16% |
| Tetrabutyl urea as wt % of working solution | 22% | 25% |
| Density of working solution (20° C.) | 950 kg/m³ | 960 kg/m³ |
| Total content of tetrahydro anthraquinones and anthraquinones |  | 122% relative A (about 18-23 wt %) |
| Hydrogen peroxide limit in working solution |  | 125% relative A |

It was thus possible to operate working solution B with a higher production capacity than solution A.

The invention claimed is:

1. Composition useful as a working solution at production of hydrogen peroxide with the anthraquinone process comprising one or more quinones selected from the group consisting of anthraquinones and tetrahydro anthraquinones, dissolved in at least one quinone solvent and at least one hydroquinone solvent, wherein said at least one quinone solvent comprises isodurene in an amount from 15 to 100 wt % of total amount of quinone solvents and, additionally, durene in an amount not exceeding about 25 wt % of total amount of quinone solvents, the total amount of isodurene and durene constitutes from about 30 to about 100 wt % of the quinone solvents, and further wherein the weight ratio isodurene to durene in the working solution is from about 1.5:1 to about 5:1.

2. A composition as claimed in claim 1, wherein durene is present in an amount not exceeding about 25 wt % of total amount of quinone solvents.

3. A process for production of hydrogen peroxide according to the anthraquinone process including alternate hydrogenation and oxidation of one or more quinones selected from the group consisting of anthraquinones and tetrahydro anthraquinones, in a working solution comprising at least one quinone solvent and at least one hydroquinone solvent, wherein said at least one quinone solvent comprises isodurene in an amount of at least 15 wt % of total amount of quinone solvents and additionally durene in an amount not exceeding about 25 wt % of total amount of quinone solvents, the total amount of isodurene and durene constituting from about 30 to about 100 wt % of the quinone solvents, and further wherein the weight ratio isodurene to durene in the working solution is from about 1.5:1 to about 5:1.

4. A process as claimed in claim 3, wherein said at least one quinone solvent comprises from about 20 to about 80 wt % of isodurene.

5. A process as claimed in claim 4, wherein the working solution comprises from about 25 to about 70 wt % of isodurene.

6. A process as claimed in claim 3, wherein the molar ratio of tetrahydro anthraquinones to anthraquinones in the working solution to be hydrogenated exceeds 1:1.

7. A process as claimed in claim 6, wherein the molar ratio of tetrahydro anthraquinones to anthraquinones in the working solution to be hydrogenated is from about 2:1 to about 50:1.

8. A process as claimed in claim 3, wherein durene is present in an amount not exceeding about 25 wt % of total amount of quinone solvents.

9. A process as claimed in claim 3, wherein said at least one hydroquinone solvent comprises one or more compounds selected from the group consisting of di-isobutyl carbinol and tetrabutyl urea.

10. A process for production of hydrogen peroxide according to the anthraquinone process including alternate hydrogenation and oxidation of one or more quinones selected from the group consisting of anthraquinones and tetrahydro anthraquinones, in a working solution comprising at least one quinone solvent and at least one hydroquinone solvent, wherein said at least one quinone solvent comprises isodurene in an amount from about 20 to 80 wt % of total amount of quinone solvents and additionally durene in an amount not exceeding about 25 wt % of total amount of quinone solvents, the total amount of isodurene and durene constituting from about 30 to about 100 wt % of the quinone solvents, and wherein the weight ratio isodurene to durene in the working solution is from about 1.5:1 to about 5:1, and further wherein said at least one hydrociuinone solvent comprises one or more compounds selected from the group consisting of di-isobutyl carbinol and tetrabutyl urea.

11. A process as claimed in claim 10, wherein the working solution comprises from about 25 to about 70 wt % of iso-durene.

12. A process as claimed in claim 10, wherein the molar ratio of tetrahydro anthraquinones to anthraquinones in the working solution to be hydrogenated exceeds 1:1.

13. A process as claimed in claim 12, wherein the molar ratio of tetrahydro anthraquinones to anthraquinones in the working solution to be hydrogenated is from about 2:1 to about 50:1.

14. A process as claimed in claim 10, wherein durene is present in an amount not exceeding about 25 wt % of total amount quinone solvents.

* * * * *